United States Patent [19]
Kawamura et al.

[11] Patent Number: 6,163,344
[45] Date of Patent: *Dec. 19, 2000

[54] ELECTRONIC CAMERA THAT TRANSFERS SIGNALS TO AN EXTERNAL DEVICE

[75] Inventors: Tomoaki Kawamura, Kawasaki; Akihiko Hamamura, Chiba, both of Japan

[73] Assignee: Nikon Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/701,995

[22] Filed: Aug. 23, 1996

[30] Foreign Application Priority Data

Aug. 31, 1995 [JP] Japan ................................. 7-223986

[51] Int. Cl.$^7$ ............................................. H04N 11/00
[52] U.S. Cl. ......................... 348/552; 348/207; 348/220; 348/373
[58] Field of Search .................................. 348/207, 231, 348/232, 233, 552, 373, 374, 375, 376; 395/893; 361/737, 683, 682; H04N 5/225, 11/00

[56] References Cited

U.S. PATENT DOCUMENTS

| | | |
|---|---|---|
| 5,018,017 | 5/1991 | Ssaki et al. ........................... 348/233 |
| 5,438,359 | 8/1995 | Aoki ....................................... 348/552 |
| 5,475,441 | 12/1995 | Parulski et al. ..................... 348/552 |
| 5,528,293 | 6/1996 | Watanabe . |
| 5,539,459 | 7/1996 | Bullitt et al. . |

FOREIGN PATENT DOCUMENTS 7-274108  10/1995  Japan .

*Primary Examiner*—Tuan Ho

[57] ABSTRACT

An electronic camera that includes a camera body incorporating a photographing function, and a card type recording unit loading unit connected to the camera body by an electrical mechanical connecting unit, and loadable into a card type recording medium slot of an external device. The card type recording medium loading unit is provided with a card type recording medium connector for a connection to a connector of the card type recording medium slot when inserting the card type recording medium loading unit into the card type recording medium slot of the external device. The card type recording medium loading unit is provided so that the loading unit changes its position to a housing position of being housed into the camera body, and to an eject position of being ejected sideways of the camera body.

3 Claims, 6 Drawing Sheets

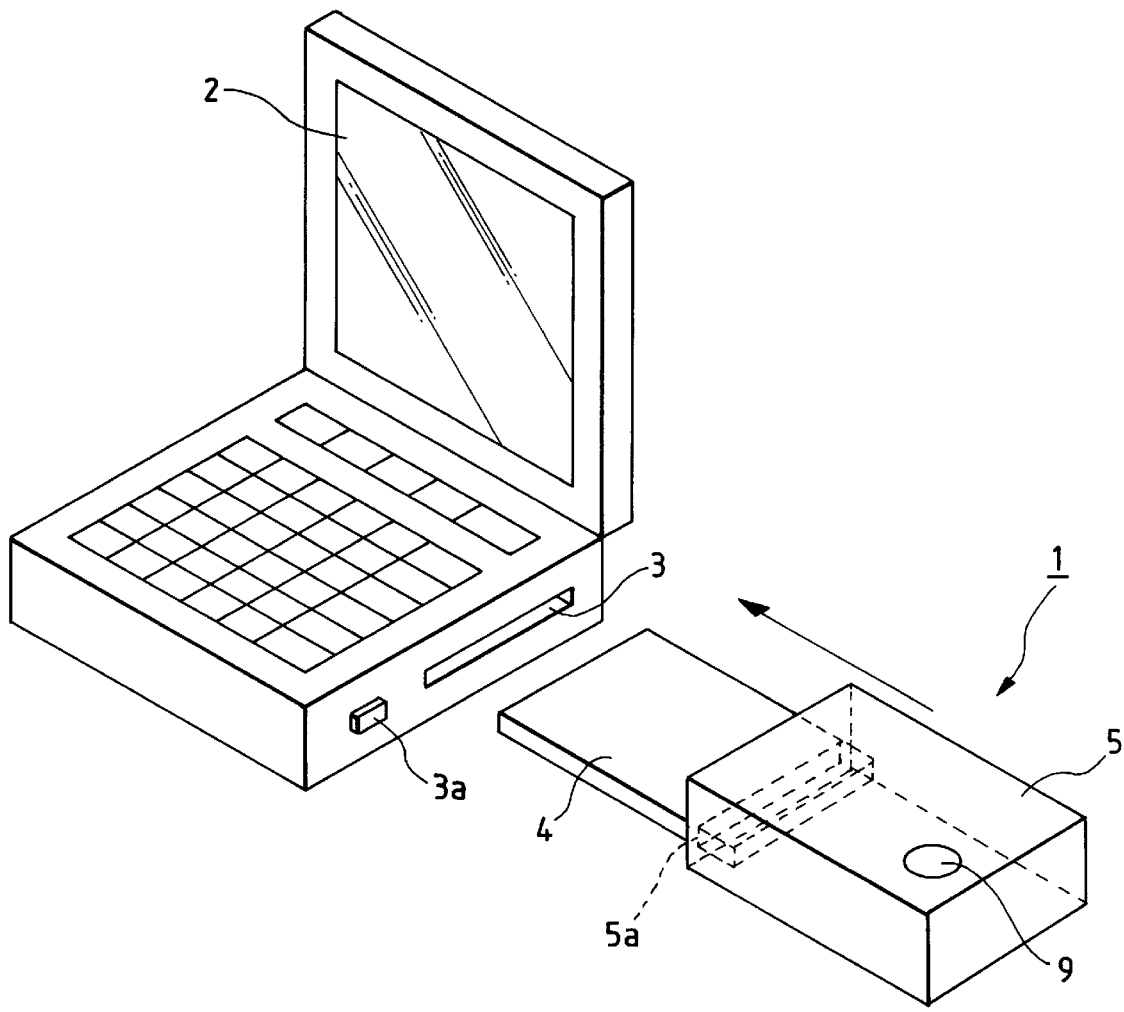

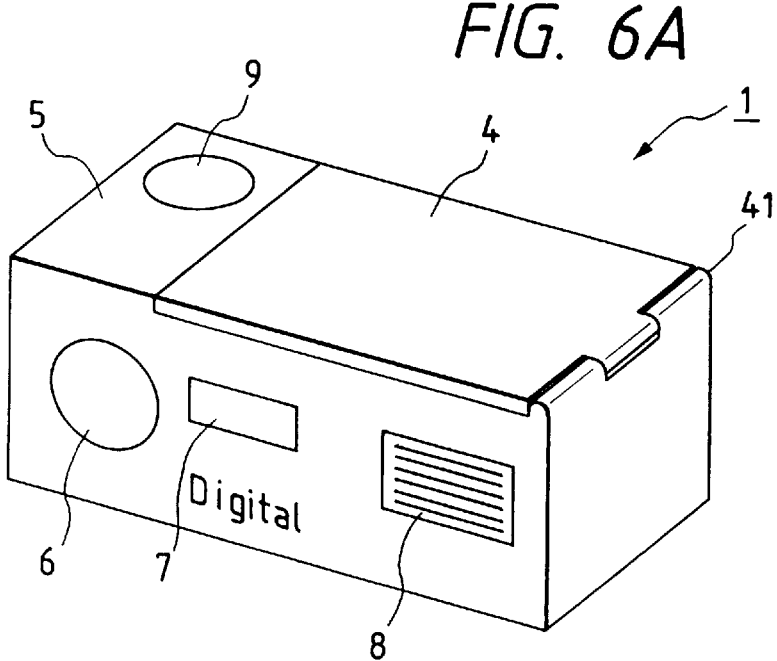
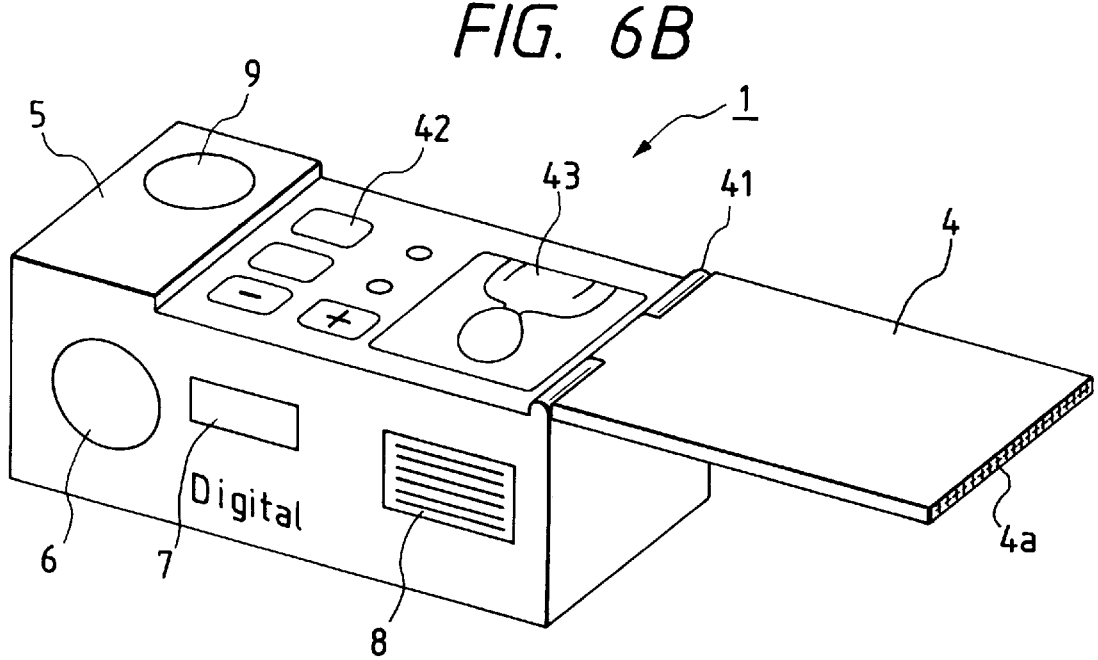

ELECTRONIC CAMERA THAT TRANSFERS SIGNALS TO AN EXTERNAL DEVICE

BACKGROUND OF THE INVENTION

1. Field of the Invention

The present invention relates generally to an electronic still camera including a storage device such as a flash memory for storing a photographed image taken in by an imaging device and, more particularly, to an interface module for an external connection to an external device such as a personal computer in this electronic still camera.

2. Related Background Art

A known conventional electronic still camera is constructed to convert an image of an object that is taken in by an imaging device into digital signals and stores a storage medium such as a flexible disk or a memory card with the digital signals.

This kind of conventional electronic still camera is constructed such that the storage medium stored with the photographed image is removed from the camera after the photography and loaded into a slot for a card type recording medium of the personal computer, or the electronic still camera is connected via a communication interface such as RS-232C to the personal computer, or image signals written to the storage medium can be taken into an external device such as the personal computer.

In particular, a wide-spread use of a large capacity memory card can be seen recently, and a larger number of reading device therefor are—although an install type of reading device is a matter of course—of such a type as to be loaded into portable personal computers. It may often happen that the reading device is used while being carried outside together with the electronic still camera.

The above-described prior art electronic still camera has such a problem that the storage medium is removed from the camera and reinserted into a PC card slot of a portable type or an install type personal computer, or the camera must be connected to the personal computer via a communication cable, and therefore the connection to the personal computer is troublesome.

Especially when the electronic still camera is connected via the communication cable to the computer, the computer might need a special driver software for receiving the data, and, as a matter of course, the special cable must be prepared. The equipment consequently increases in number enough to be inconvenient for preservation. Besides, the connecting operation using the cable is troublesome to even a user familiar with using the electronic appliances as well as to a beginner.

In this respect, the camera using an attachable/detachable PC card as a storage medium is advantageous. While on the other hand, the camera body is provided with members exclusive of a memory and a connector and needed for the electronic still camera and therefore increases in size. Further, the camera body thus incorporates a great number of functions and hence becomes expensive.

It may also often happen that the data are received and transferred between the above-mentioned electronic still camera and the personal computer outside and places to which the users go. According to a method of attaching and detaching the PC card to and from the camera body each time, the user is required to pay sufficient attention to a treatment not to drop or lose the PC cared together with the camera. It is desired that this point be taken into consideration.

SUMMARY OF THE INVENTION

It is an object of the present invention, which was contrived under such circumstances, to provide an easy-to-operate electronic still camera that can be manufactured thin, small in size and light in weight, wherein a connection to an external device can be easily be made by such a simple operation as to directly load a part of a camera body into a PC card slot of an external device enough for every user to simply connect the camera body to the external device, and besides there are no connection parts excluding the camera body and the external device.

To accomplish the above object, according to the present invention, an electronic still camera comprises a camera body incorporating a photographing function, and a card type recording medium loading unit connected to the camera body by an electrical mechanical connecting unit and loadable into a card type recording medium slot of an external device. The card type recording medium loading unit is provided with a card type recording medium connector for a connection to a connector of the card type recording medium slot when inserting the card type recording medium loading unit into the card type recording medium slot of the external device. The card type recording medium loading unit is provided so that the loading unit changes its position to a housing position of being housed into the camera body and to an eject position of being ejected sideways of the camera body.

Herein, in the electronic still camera according to the present invention, the camera body includes an optical system unit having a photographing lens facing to a photographed object and an imaging device for taking in light components via the photographing lens and converting the light components into electric signals. The camera body also includes a signal processing unit for converting output signals of the imaging device into image signals, and a storage device for storing the image signals outputted from the signal processing unit. The camera body further includes a switching unit for turning ON/OFF the imaging device and the signal processing unit, and a battery for electrifying the imaging device, the signal processing unit and the storage device. Note that the storage device may be provided in the card type recording medium loading unit provided in the camera body.

Further, in the electronic still camera according to the present invention, the card type recording medium loading unit is provided so that the loading unit can be ejected from and housed into an ejection port formed in a side portion of the camera body. Alternatively, the card type recording medium loading unit is provided on one side surface of the camera body so as to be rotatable about a rotary shaft provided along a side surface edge thereof, or about a rotary shaft so provided as to be orthogonal to a side surface. Further, at least one of a display unit for displaying various items of data containing light data obtained by the imaging device and a setting operation unit for performing a variety of setting operations is provided on one side surface of the camera body so that the above one unit is covered with the card type recording medium loading unit when the loading unit is housed.

According to the present invention, the card type recording medium (PC card) loading unit is connected to a part of the camera body constituting the electronic still camera via the electrical mechanical connecting member and is thus provided so that the same loading unit can be ejected and housed. This card type recording medium loading unit is formed in such a configuration that the loading unit can be directly loaded into the PC card slot of the personal computer, and the camera body incorporates the members necessary for the electronic still camera. Then, the PC card loading unit is normally housed in the camera body, and meanwhile the photographing operation can be performed. Moreover, when connected to the personal computer or the external device such as a PC card drive device, etc. connected to the personal computer, the PC card loading unit is ejected from the camera body and loaded thereinto by inserting this PC card loading unit into the PC card slot. The communications between the external device and the storage device can be thereby performed, and the image signals written to the storage device can be read from the external device.

According to the present invention having the above construction, there is required nothing but the camera body and the external device, such as the storage medium and the communication cable. The users ranging from the beginner to the well-experienced are able to connect the electronic still camera to the external device by a simple method. Owing to this, when carrying the electronic still camera and the personal computer, this electronic still camera can be connected to the personal computer in an extremely simple manner in a place to which the user goes. Furthermore, the PC card loading unit is applicable to the PC card standards and can be therefore connected to even the existing personal computer, etc. by directing loading the PC card loading unit into the PC card slot.

Herein, the external device is the personal computer or the PC card driver device added to the personal computer. The card type recording medium slot is a so-called PC card slot formed in the above external device. Note that the card type recording medium is a so-called PC card, and this PC card is classified into a memory card, an interface card and a MODEM card and is so used as to be loaded into the above-described PC card slot.

Further, when the signal processing unit converts the output signals from the imaging device into the image signals, not only the digital signals but also the analog signals may be available. Furthermore, the image signals transmitted from the signal processing unit and stored in the storage device are not limited to the digital signals but may be the analog signals.

The above-mentioned storage device may be built in the camera body or provided in the PC card loading unit selectively ejected from the camera body, or provided in both of the camera body and the PC card loading unit.

The above and other objects, features and advantages of the present invention will be explained hereinafter and may be better understood by reference to the drawings and the descriptive matter which follows.

BRIEF DESCRIPTION OF THE DRAWINGS

FIG. 3 is a perspective view showing a state where the PC card loading unit of the electronic still camera shown in FIGS. 1A and 1B is loaded into a PC card slot;

FIGS. 6A and 6B are perspective views of a further embodiment of the electronic still camera of the present invention, FIG. 6A illustrating a state where the PC card loading unit is housed, and FIG. 6B illustrating a state where the PC card loading unit is ejected.

DETAILED DESCRIPTION OF THE PREFERRED EMBODIMENTS

Figure 1A:
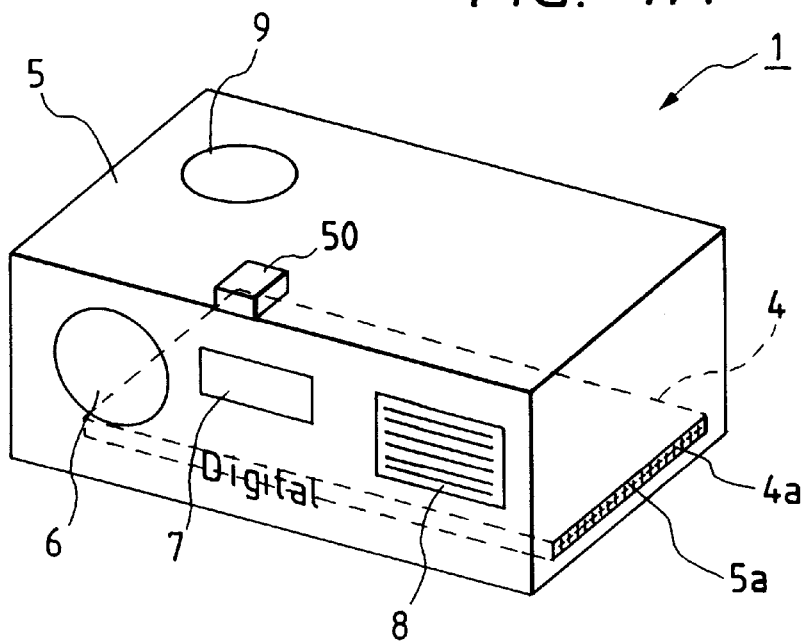
FIGS. 1A and 1B are perspective views of one embodiment of an electronic still camera according to the present invention, FIG. 1A illustrating a state where a PC card loading unit is housed, and FIG. 1B illustrating a state where the PC card loading unit is ejected.

FIGS. 1A through 3 show one embodiment of an electronic still camera according to the present invention. Throughout these Figures, the reference numeral 1 designates an electronic still camera characterizing the present invention.

Herein, this electronic still camera 1, as illustrated in FIG. 3, includes a camera body 5 constructed to always house a PC card loading unit 4 loadable into a PC card slot 3 formed in a side surface of a personal computer 2 serving as an external device and to eject this PC card loading unit 4 when connected to the external device.

Note that an eject button generally designated by 3a in FIG. 3 is provided on the side surface of the personal computer 2 and is a member operated when ejecting the PC card loading unit 4 loaded into the PC card slot 3. A contrivance thereof is that the PC card loading unit 4 can not be normally pulled out unless this button 3a is operated.

Figure 1B:
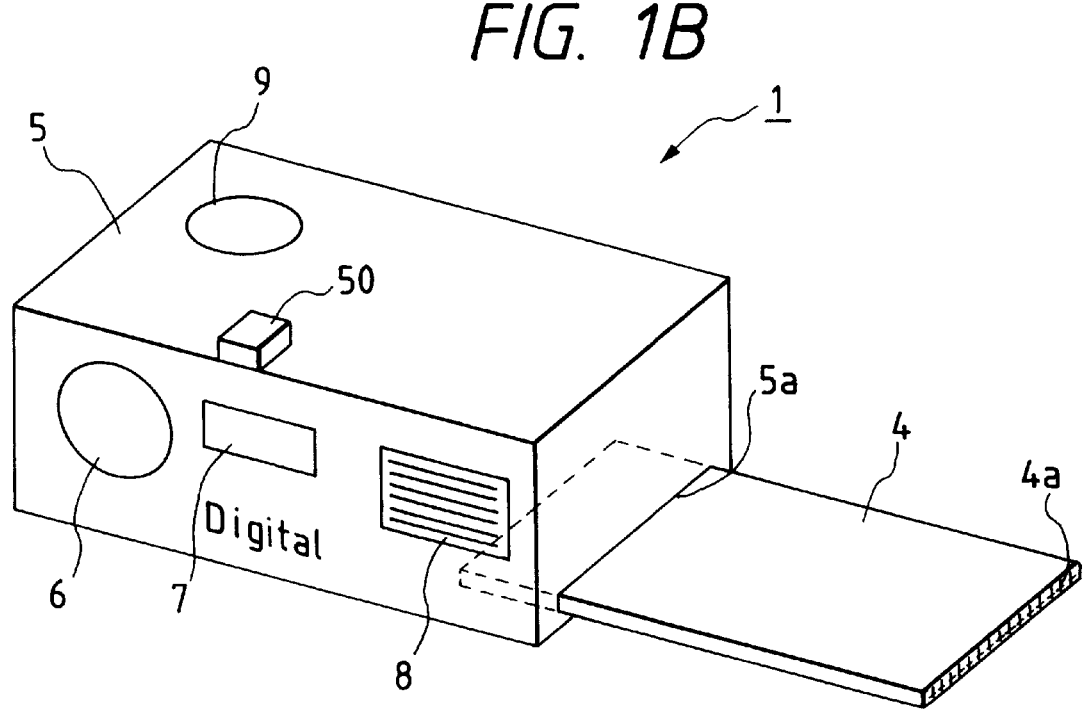

The camera body 5, as illustrated in FIGS. 1A and 1B, takes substantially a rectangular parallelopiped shape on the whole. The camera body 5 is provided, on the front surface thereof, with a photographing lens 6, an optical system unit consisting of a CCD device (not shown) defined as an imaging device, a finder window 7 and a light emitting unit 8 of a flash device for executing flash photography. Provided further on an upper surface thereof is a release button 9 operated when performing a photographing operation. Note that the camera body 5 properly incorporates, though not illustrated, as a matter of course, parts and mechanisms needed for this kind of electronic still camera 1.

An opening 5a taking a thin slot-like shape is formed in the side surface of the camera body 5. The PC card loading unit 4 is inserted and normally housed in the camera body 5 through this opening 5a. Besides, when required, i.e., when connected for receiving and transferring the data from and to the personal computer 2, the PC card loading unit 4 is ejected out of the camera body 5. Note that this PC card loading unit 4 is connected by an electrical mechanical connecting member within the camera body 5, e.g., by a guide member for guiding the PC card loading unit 4 so that the PC card loading unit 4 can be freely intruded and extruded, a lock member for locking it in a predetermined eject position and a flexible wiring board (which are all unillustrated).

Further, though an illustration is omitted, there may be additionally provided an operation member such as an operation knob for ejecting the PC card loading unit 4 housed in the camera body 5 or housing it thereinto.

Herein, the PC card loading unit 4 takes a form of a PC card by constructing a flat plate satisfying dimensional standards of one of types I, II, III and IV in an IC card or an I/O card (hereinafter referred to as a PC card) based on PCMCIA (Personal Computer Memory Card International Association)/JEIDA (Japan Electronic Industry Development Association) standards.

In this case, this embodiment, if based on the dimensional standards of the type I, provides a PC card member having a width of 85.6±0.2 mm, a height of 54.0±0.1 mm, and a thickness of 3.3±0.1 mm. The PC card loading unit 4 ejected from the camera body 5 can be thereby, as shown in FIG. 3, directly inserted in the PC card slot 3 of the personal computer 2 and thus loaded.

Figure 2:
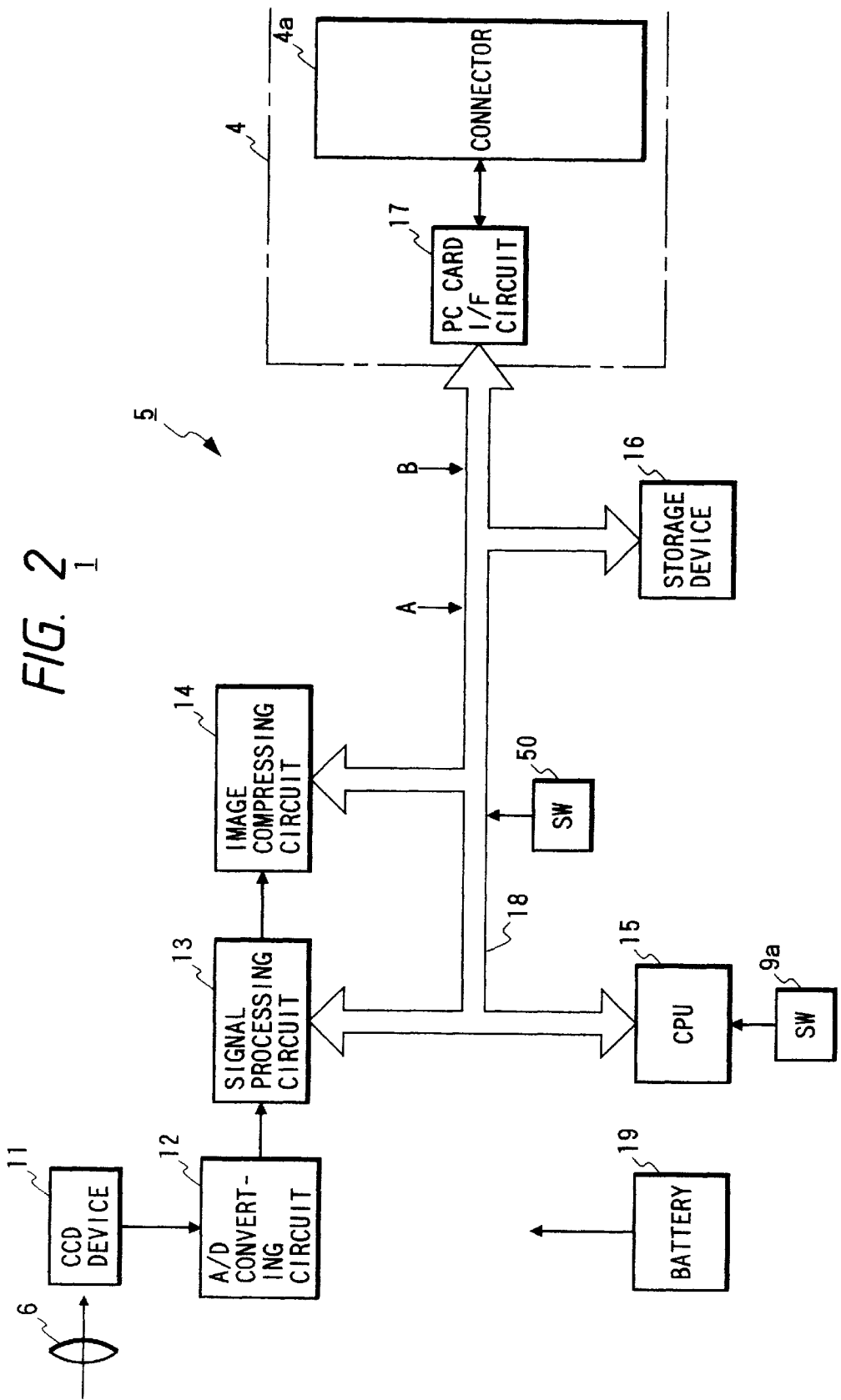
FIG. 2 is a block diagram of the electronic still camera shown in FIGS. 1A and 1B.

Provided further at an outer end of the PC card loading unit 4 is, as shown in FIGS. 1A, 1B and 2, a PC card connector 4a, prescribed based on the PCMCIA/JEIDA standards, for a connection to an unillustrated connector within the PC card slot 3. This connector 4a is a 68-pin connector prescribed on the PC card standards. Note that a side edge of the outer end of the PC card loading unit 4 may be formed with a notch or a groove for preventing a reverse insertion into the PC card slot 3.

With this contrivance, the PC card loading unit 4 in the camera body 5 constituting the electronic still camera 1 can be, as shown in FIG. 3, directly inserted into the PC card slot 3 of the personal computer 2 and thus connected thereto.

Herein, the standard dimensions of the type I base on the PC card standards described above have a width of 54.0±0.1 mm, a length of 85.6±0.2 mm, and a. thickness of 3.3±0.1 mm. Further, the standard dimensions of the type II have a width of 54.0±0.1 mm, a length of 85.6±0.2 mm, and a thickness of 3.3±0.1 mm, and the body unit has a thickness of 5.0 mm at the maximum. According to the standard dimensions of the type III, a width is 54.0±0.1 mm, a length is 85.6±0.2 mm, and a thickness is approximately 10.5 mm at the maximum. According to the standard dimensions of the type IV, a width is 54.0±0.1 mm, a length is 85.6±0.2 mm, and a thickness is approximately 16.0 mm at the maximum.

The electronic still camera 1 comprises the thus constructed camera body 5 and PC card loading unit 4 is housed internally with, as shown in FIG. 2, the PC card connector 4a, a variety of circuits required for the photographing and storage as well, and also a power supply. More specifically, referring to FIG. 2, the reference numeral 11 represents a CCD device defined as an imaging device for converting the light passing through the photographing lens 6 into an electric signal. Designated by the reference numeral 12 is an A/D converting circuit for converting an output signal of the CCD device 11 into digital data. The reference numeral 13 denotes a signal processing circuit serving as a signal processing unit for converting the digital signal from the A/D converting circuit 12 into an image signal. The reference numeral 14 indicates an image compressing circuit for compressing the image signal outputted from the signal processing circuit 13.

Designated also by the reference numeral 15 is a CPU for controlling the electronic still camera 1. The reference numeral 16 represents a storage device constructed of a flash memory or a static RAM (SRAM) for storing the image signal.

The reference numeral 17 denotes a PC card interface circuit serving as an interface module for executing a protocol conversion process between the IC memory card interface or the I/O card interface (hereinafter termed a PC card interface) based on the PCMIA/JEIDA standards, and the above-mentioned storage device 16.

Further, the reference numeral 18 represents a bus, and the reference numeral 19 designates a battery such as an Ni—Cd gum battery for supplying electric power to the electronic still camera. Designated by 9a is a release switch operated upon pushing the release button 9.

Next, the operation of the thus constructed electronic still camera 1 will be explained.

That is, when the release switch 9a is operated by pushing the release button 9, the light beams emerging from a photographed object and then passing through the photographing lens 6 are separated by unillustrated complementary color filters of the CCD device 11 into a Ye (Yellow) color light component, a Cy (Cyan) color light component, a Mg (Magenta) color light component and a G (Green) color light component. Then, thus separated light components are converted into electric signals by pixels of the CCD device 11 that correspond to the respective color filters Ye, Cy, Mg and G. Thus, the color signals Ye, Cy, Mg and G are outputted from the CCD device 11.

The A/D converting circuit 12 converts those color signals Ye, Cy, Mg, G into digital data.

Subsequently, the signal processing circuit 13 consisting of, e.g., a DSP (Digital Signal Processor) generates the image signals from these pieces of digital data. In accordance with this embodiment, the image signals are a luminance signal Y generated by a color conversion defined one of DSP processes, a chrominance signal R-Y obtained by subtracting the luminance signal Y from the red color signal R, and a chrominance signal B-Y obtained by subtracting the luminance signal Y from the blue color signal B.

Further, the signal processing circuit 13, in addition to the color conversion, executes processes such as a pixel interpolation process, a horizontal/vertical outline emphasizing process, and a γ (gamma) correction process. Accordingly, the signal processing circuit 13, after performing these processes, outputs the image signals to the image compressing circuit 14.

Then, the image compressing circuit 14, after storing an unillustrated internal memory with the image signals outputted from the signal processing circuit 13, compresses these image signals in a JPEG (Joint Photographic Experts Group) format.

Note that the color filters, used in this embodiment, of the CCD device 11 are of the complimentary color type, but there may also be used three primary color filters R (Red), G (Green) and B (Blue). In this case, the signal processing circuit 16 may generate the image signals from the three primary color signals R, G and B obtained by the CCD device 14.

Further, as to the operations of the release button 9, to start with, when lightly pushing the release button 9, i.e., when a so-called half-push switch is turned ON, the CPU 15 controls the CCD device 11, the A/D converting circuit 12, the signal processing circuit 13 and the image compressing circuit 14, thus making the memory of the image compressing circuit 14 take in the image signals as operated above.

Next, a signal accumulation time of the CCD device 11 is adjusted based on a luminance level of the image signal before being compressed in order to obtain an optimal brightness of the image.

Then, when the release button 9 is depressed further deeply, i.e., when a so-called full-push switch is turned ON, the CPU 15 causes the memory of the image compressing circuit 14 to take in the image signal according to the adjusted signal accumulation time. This item of data is normal data taken in upon operating the release button 9. In the electronic shutter operation of the CCD device 11 for thus picking up only signal electric charges of the signal accumulation time, the signal accumulation time is adjusted, thereby obtaining the image signal having the optimal brightness.

Subsequently, the CPU 15 reads the image signals compressed in the JPEG format out of the image compressing circuit 14 and writes the read data to a predetermined area of the storage device 16 in a DOSFAT (Disk Operating System File Allocation Table) so as to be usable by a personal computer loaded with MS-DOS classified as one kind of OS (Operating System). Thus, each time the release button 9 is pushed, the compressed image signal is written to each area of the storage device 16. A plurality of image signals are thus recorded by repeating such a process.

Next, when the photography has been finished, the PC card loading unit 4 of the camera body 5 is inserted into the PC card slot 3 of the personal computer 2 as shown in FIG. 3. Upon the insertion of the PC card loading unit 4, the PC card connector 4a is connected to the connector within the PC card slot 3, and the camera body 5 is thereby electrically connected to the personal computer 2. Therefore, the personal computer 2 accesses the storage device 16 within the camera body 5 via the unillustrated internal PC card interface (PC card controller) and thus reads the image signals stored in the storage device 16.

At this time, the PC card interface circuit 17 executes the protocol conversion process between the storage device 16 and the PC card interface within the personal computer 2, thereby enabling the storage device 16 and the personal computer 2 (the PC card interface) to communicate with each other. This protocol conversion process differs depending on specifications of the PC card interface between the PC card interface circuit 17 and the personal computer 2. For instance, if the storage device 16 is a flash memory, and if the above specifications are classified as ATA (AT Attachment) specifications, an ATA flash memory conversion is to be executed. If classified as AIMS (Auto Indexing Mass Storage) specifications, an AIMS flash memory conversion is to be executed.

In this way, the image signals obtained by the electronic still camera 1 can be employed in the personal computer 2.

Note that the image compressing circuit 14 compresses the image signals in accordance with this embodiment, but, if a record number of the image signals to be written to the storage device 16 is small, the image signals before being compressed may be written directly to the storage device 16.

Further, the personal computer 2 has been exemplified by way of an external device for reading the image signals. However, a PC card drive device formed with the PC card slot 3 may be available. In this case, the data read by the PC card drive device is transferred to the personal computer.

Connected further via the bus 18 to the storage device 16 are the camera-side circuit constructed of the signal processing circuit 13, the image compressing circuit 14 and the CPU 15, and the PC card interface circuit constructed of the PC card interface circuit 17 in accordance with this embodiment. With this construction, there arises a practical problem in which the camera side and the interface side simultaneously access to the storage device 16.

Under such circumstances, bus buffers are provided at points A and B on the bus 18. In a normal state wherein the electronic still camera 1 is not inserted into the PC card slot 3, the point-A bus buffer is in a closed-state (conductive state), while the point-B bus buffer is in an opened-state (cut-off state). The camera side is thereby connected to the storage device 16, and it follows that the storage device 16 is separated from the PC card interface circuit 17.

Then, the electronic still camera 1 is inserted into the PC card slot 3, whereby a power supply voltage is supplied to a power supply pin of the PC card connector 4a from the personal computer 2. Hereupon, the point-A bus buffer is set in the opened-state, while the point-B bus buffer is set in the closed-state. The camera side is thereby separated from the storage device 16, while the storage device 16 is connected to the PC card interface circuit 17.

Thus, the above problems can be obviated with a simpler construction than by providing the controller for the control process on the bus 18.

Further, in accordance with the second embodiment, the interface module for performing the communications with the external device involves the use of the PC card interface circuit 17. However, in place of this circuit 17, the CPU 15 may serve as an interface module.

In this case, the PC interface circuit 17 functions as a two-way I/O buffer. To be more specific, in the case of accessing from the personal computer 2, the camera side disconnects the personal computer 2 side. Reversely in the case of accessing from the camera side, the computers side disconnects the camera side.

Then, the CPU 15 receives a command from the computer 2, then reads the image from the storage device in accordance with this command, and transmits the image signal to the computer 2. With this operation, the CPU 15 is capable of executing the protocol conversion process.

Moreover, the CPU 15 is capable, upon sensing the loading of the PC card loading unit 4 into the slot 3, of automatically switching from a state (photographing mode), where it is possible to photograph and record, to another state (transferring mode), where it is possible to transfer an image signal to the personal computer 2.

Also, as shown in FIGS. 1A, 1B and 2, there is provided a switch 50 for sensing whether the PC card loading unit 4 is housed in the camera body 5 or is ejected. The CPU 15 switches from the transferring mode to the photographing mode when the PC card loading unit 4 is housed, and from the photographing mode to the transferring mode when it is ejected.

Moreover, if an LCD monitor screen (not shown) is provided on a part of the camera body 5 described above, it can be considered that the above CPU 15 senses the loading into the slot 3, thus controlling whether or not the image should be displayed on the monitor screen.

Figure 4A:
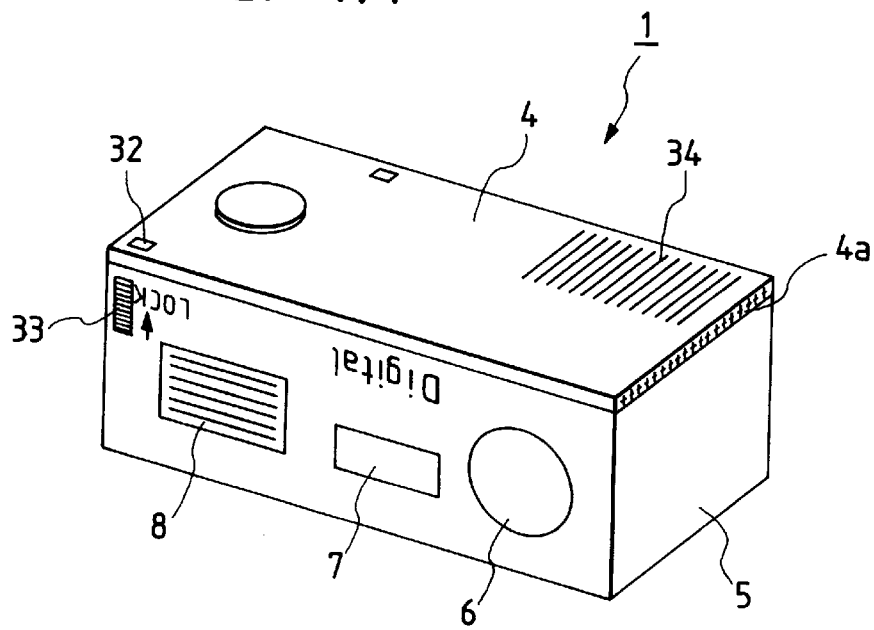
FIGS. 4A and 4B are perspective views of another embodiment of the electronic still camera of the present invention, FIG. 4A illustrating a state where the PC card loading unit is housed, and FIG. 4B illustrating a state where the PC card loading unit is ejected.
Figure 4B:
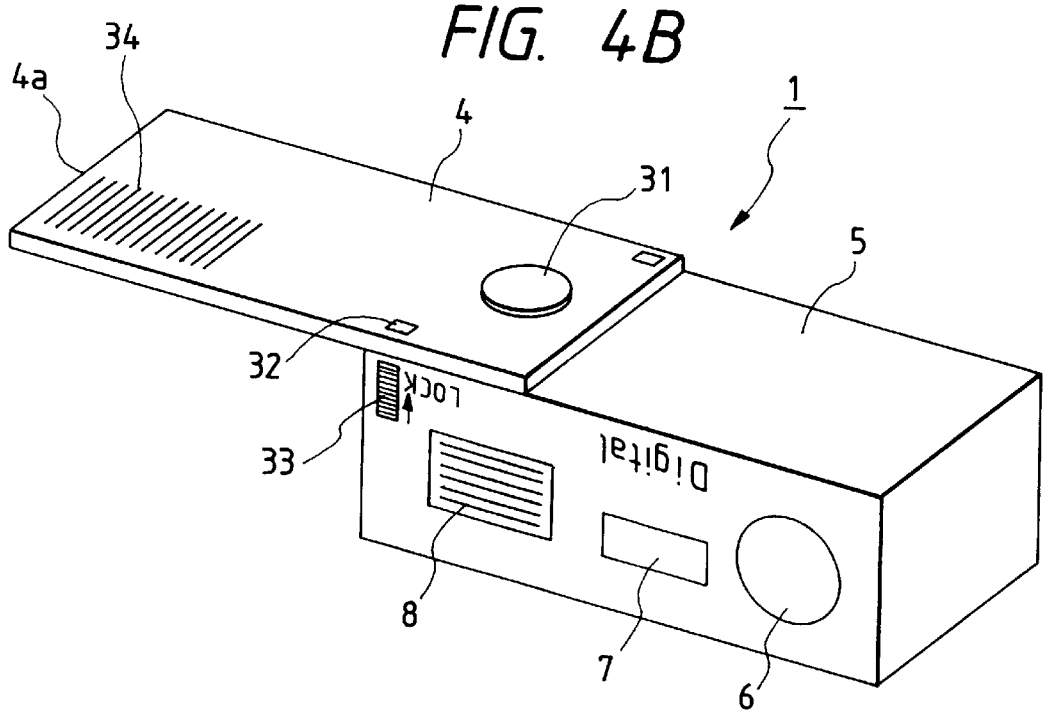
Figure 5A:
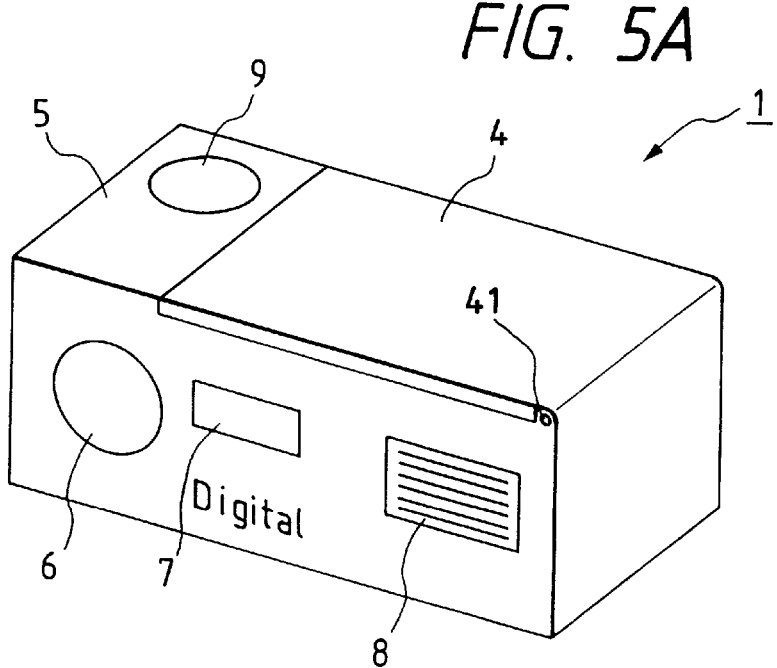
FIGS. 5A and 5B are perspective views of still another embodiment of the electronic still camera of the present invention, FIG. 5A illustrating a state where the PC card loading unit is housed, and FIG. 5B illustrating a state where the PC card loading unit is ejected.
Figure 5B:
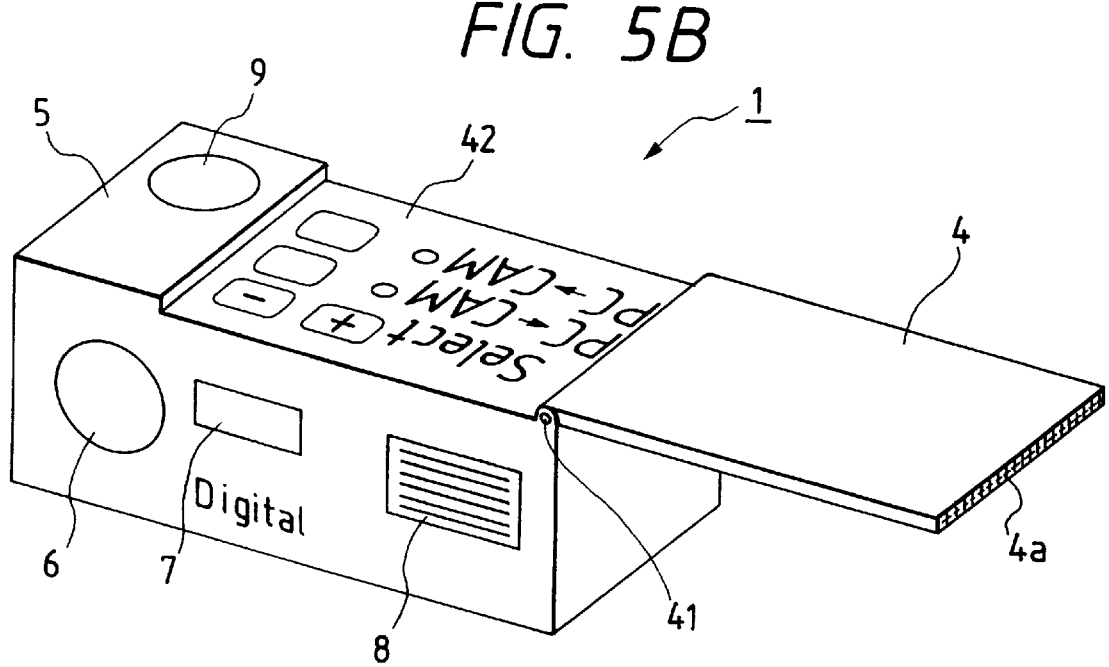

FIGS. 4A and 4B show another embodiment of the present invention. In accordance with this embodiment, the PC card loading unit 4 is so provided on a lower surface of the camera body 5 as to be rotatable about a rotary shaft 31 provided at an axial line orthogonal to the lower surface. The PC card loading unit 4 is provided so that the PC card loading unit 4 changes its position with the rotations thereof to a state where the unit 4 is housed in the camera body 5 and to a state where the unit 4 is ejected.

Note that the reference numeral 32 in FIGS. 4A and 4B represents a lock hole of the PC card loading unit 4, and the reference numeral 33 denotes an operation lever for locking and unlocking. Designated by the reference numeral 34 is a manual rotary portion for rotating the PC card loading unit 4 with a finger.

Then, with such a construction too, the PC card loading unit 4 is normally integrally housed in the camera body 5.

When required, the PC card loading unit 4 is rotated and ejected sideways enough to be in a loadable state into the PC card slot 3 of the personal computer 2.

FIGS. 5A, 5B, 6A and 6B illustrate still another embodiment of the present invention. According to this embodiment, the PC card loading unit 4 is provided on a part of the upper surface of the camera body 5 so that the PC card loading unit 4 can be ejected by pulling it up and housed by pushing it down, wherein the side end edge thereof serves as a rotary shaft 41.

With this construction, a display panel unit 43 and an operation unit 42 used when connected to the external device can be provided on an area normally covered with the PC card loading unit but exposed when ejected. Then, according to this structure, it is feasible to prevent the display panel unit 43 from being damaged and the operation unit 42 from a malfunction when photographed or preserved.

Further, the PC card connector 4a provided at the outer end of the PC card loading unit 4 can be structured not to be exposed by housing the connector 4a into a stepped portion of the camera body 5 when housing the PC card loading unit 4, and hence there might be such an advantage that the terminal of the connector 4a is not damaged at all.

Note that the present invention is not limited to the structures explained in the embodiments discussed above, and, as a matter of course, the configurations and the structures of the respective units can be properly modified and changed.

For example, the configuration or the structure of the camera body 5 is not confined to the rectangular parallelopiped shape, and the parts incorporated therein can be freely incorporated into the camera properly as the necessity arises. Further, other combinational structures by which the PC card loading unit 4 can be housed into and ejected from the camera body 5 may include modifications excluding the embodiments discussed above.

Herein, the card recording medium slot 3 may be a slot through which the interface card and the memory card as a so-called PC card can be loaded.

Furthermore, when the above-mentioned signal processing unit converts the output signal from the above-described imaging device into the image signal, the signal is not limited to the digital signal but may be an analog signal. Moreover, the image signal transmitted from the signal processing unit and stored in the storage device is not confined to the digital signal but may be the analog signal. Further, the storage device 16 may be built in the camera body 5, or may be provided in the PC card loading unit 4, or may be provided in both of the camera body 5 and the PC card loading unit 4.

The CCD device 11 employed as the imaging device must be, e.g., on the order of 250,000 pixels each having a corner of 8 mm.

Exemplified is the PC card slot of the notebook type personal computer as the external device.

Further, the card recording medium known as the PC card is loaded into the card recording medium slot 3 of the external device, but the recording medium as the so-called PC card may have only the interface function.

The electronic still camera according to the present invention, as discussed above, comprises the camera body incorporating the photographing function, and the PC card loading unit loadable into the PC card slot of the external device and connected to the camera body by the electrical mechanical connecting member. The PC card loading unit is provided with the PC card connector for the connection to the PC card slot connector when inserting the PC card loading unit into the PC card slot of the external device. The PC card loading unit is provided so that the PC card loading unit changes its position to the housing position of being housed into the camera body and to the eject position of being ejected sideways of the camera body, and hence such as simple construction is provided. Nevertheless, the following excellent effects are exhibited.

That is, according to the present invention, the electronic still camera can be manufactured thin in a small size with a light weight and at low costs. Besides, a part of the camera body is loaded directly into the PC card slot of the external device. With this simple operation, the connection to the external device can be easily made enough for every user to connect the camera body to the external device. Besides, there is no parts for the connection, excluding the camera body and the external device, and there is an advantage of being easy to deal with.

Herein, according to the present invention, the camera body may include the optical system unit having the photographing lens facing to the photographed object and the imaging device for taking in light components via the photographing lens and converting the light components into electric signals. The camera body may also include the signal processing unit for converting the output signals of the imaging device into the image signals, and the storage device for storing the image signals outputted from the signal processing unit. The camera body may further include the switching unit for turning ON/OFF the imaging device and the signal processing unit, and the battery for electrifying the imaging device, the signal processing unit and the storage device. Further, the storage device described above may be provided in the PC card loading unit incorporated into the camera body.

Further, the PC card loading unit is provided so that the PC card loading unit can be ejected from and housed into the ejection port formed in the side portion of the camera body, or provided on one side surface of the camera body so as to be rotatable about the rotary shaft provided along the side surface edge or about the rotary shaft so provided as to be orthogonal to the side surface. Further, at least one of the display unit for displaying various items of data containing the light data obtained by the imaging device and the setting operation unit for performing a variety of setting operations may be provided on one side surface of the camera body so that this unit is covered with the PC card loading unit when the PC card loading unit is housed.

According to such a construction, the electronic still camera is capable of executing the photography while the PC card loading unit is normally housed into the camera body. Furthermore, when connected to the personal computer or to the external device such as the PC card drive device, etc. connected to the personal computer, the PC card loading unit ejected from the camera body and loaded by inserting it into the PC card slot. The communications between the external device and the storage device can be thereby performed, and the image signals written to the storage device can be read from the external device.

Hence, according to the present invention discussed above, there is required nothing but the camera body and the external devices, such as the storage medium and the communication cable. The users ranging from the beginner to the well-experienced are able to connect the electronic still camera to the external device by the simple method. Owing to this, when carrying the electronic still camera and the personal computer, this electronic still camera can be connected to the personal computer in an extremely simple manner in a place to which the user goes. Furthermore, the PC card loading unit is applicable to the PC card standards and can be therefore connected to even the existing personal computer, etc. by directing loading the PC card loading unit into the PC card slot.

Having described preferred embodiments of the present invention, it is to be understood that any variations will occur to those skilled in the art within the scope of the appended claims.

What is claimed is:

1. An electronic camera that transfers image signals to a connector of a card type slot of an external device, comprising:

a camera body incorporating a photographing function; and a card type loading unit connected to said camera body and loadable into the card type slot of the external device, said card type loading unit having a card type connector to connect with the connector of said card type slot when said card type loading unit is inserted into the card type slot of said external device, wherein said card type loading unit is incapable of being separated from said camera body and has a housing position in which the card type loading unit cannot be loaded into the card type slot of the external device, and an eject position in which the card type loading unit can be loaded into the card type slot of the external device, said electronic camera further comprising:

an imaging device to obtain light data;

a display unit to display various items of data containing the light data obtained by said imaging device; and a setting operation unit to perform a variety of setting operations, wherein at least one of the display unit and the setting operation unit is provided on a side surface of said camera body, so that said one unit is covered with said card type loading unit when said card type loading unit is in the housing position.

2. An electronic camera that transfers image signals to a connector of a card type slot of an external device, comprising:

a camera body incorporating a photographing function; and a card type loading unit connected to said camera body and loadable into the card type slot of the external device, said card type loading unit having a card type connector to connect with the connector of said card type slot when said card type loading unit is inserted into the card type slot of said external device, wherein said card type loading unit is incapable of being separated from said camera body and has a housing position in which the card type loading unit cannot be loaded into the card type slot of the external device, and an eject position in which the card type loading unit can be loaded into the card type slot of the external device said electronic camera further comprising a sensor to sense whether said card type loading unit is at said housing position or said eject position, wherein camera operating modes of said electronic camera are switched according to a sensing result of said sensor.

3. An electronic camera according to claim 2, wherein said camera operating modes include a photographing mode where it is possible to photographs, and a transferring mode where it is possible to transfer the image signal.

* * * * *

UNITED STATES PATENT AND TRADEMARK OFFICE
CERTIFICATE OF CORRECTION

PATENT NO.:   6,163,344
DATED     :   December 19, 2000
INVENTOR(S):  Tomoaki Kawamura, et al.

It is certified that error appears in the above-identified patent and that said Letters Patent is hereby corrected as shown below:

Column 12,   line 34, (claim 3), change "photographs," to --photograph,--.

Signed and Sealed this

First Day of May, 2001

Attest:

NICHOLAS P. GODICI

Attesting Officer        Acting Director of the United States Patent and Trademark Office